E. DEPUE.
Device for Upsetting Tires.
No. 222,469.    Patented Dec. 9, 1879.
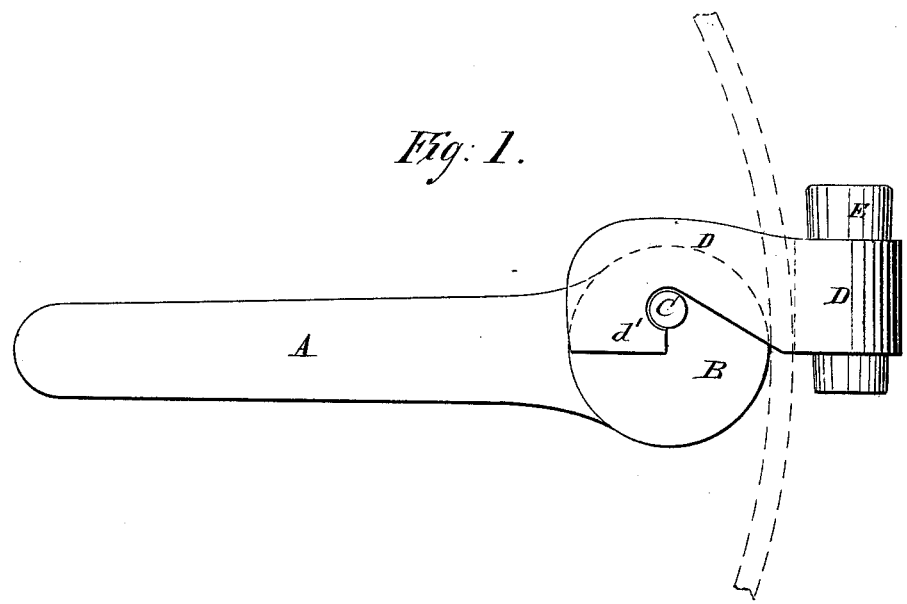
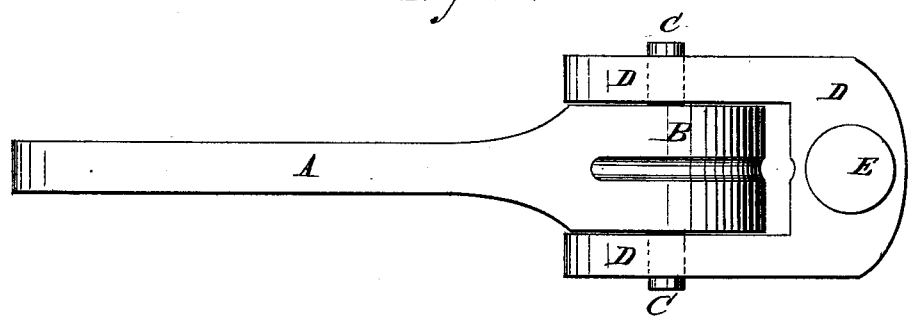
WITNESSES:
Achilles Schehl.
C. Sedgwick
INVENTOR:
E. Depue
BY Munn & Co
ATTORNEYS.

UNITED STATES PATENT OFFICE.

ELISHA DEPUE, OF SILVARA, PENNSYLVANIA.

IMPROVEMENT IN DEVICES FOR UPSETTING TIRES.

Specification forming part of Letters Patent No. 222,469, dated December 9, 1879; application filed August 23, 1879.

*To all whom it may concern:*

Be it known that I, ELISHA DEPUE, of Silvara, in the county of Bradford and State of Pennsylvania, have invented a new and useful Improvement in Tire-Upsetters, of which the following is a specification.

Figure 1 is a side view of my improved upsetter. Fig. 2 is a top view of the same.

The object of this invention is to furnish an improved tool for upsetting tires, carriage-braces and stays, iron rods, and other forgings, which shall be simple in construction, inexpensive in manufacture, convenient and effective in use, strong and durable, and not liable to get out of order.

The invention consists in the upsetter formed of the handle provided with a cylindrical head, the eccentric pin, and the U-shaped clamp, made with hooks, and in the combination of the handle provided with a cylindrical head, the eccentric pin, the U-shaped clamp, made with hooks, and the plug or pin with each other, as hereinafter fully described.

Similar letters of reference indicate corresponding parts.

A represents the handle, upon the forward end of which is formed a cylindrical head, B. C is a steel pin, which is inserted in a hole formed eccentrically through the head B, and which is made of such a length that both its ends may project. D is the gripe or clamp, which is made U-shaped and of such a size that it may receive the head B between its arms. Upon the under side of the ends of the arms of the clamp D are formed hooks $d'$, to hook upon the projecting ends of the pin C, as shown in Figs. 1 and 2.

The arms of the clamp D are made of such a length that there may be sufficient space between the bend of the said clamp D and the head B to receive the tire or other iron to be upset. In a hole in the middle part or bend of the clamp D is inserted a steel plug or head, E, to receive the blows of a hammer.

A groove may be formed in the eccentric head B, and in the inner surface of the bend of the clamp D, to adapt the tool for holding small rods or other small pieces of iron.

In using the tool for upsetting tire, the tire is heated in the place where it is to be upset, and is placed in a vise with the heated portion just above the jaws of the vise. The handle A is grasped in the left hand and the head B is held against the concave side of the tire, just above the heated portion. The clamp D is then passed around the tire, and its hooks $d'$ are hooked upon the projecting ends of the pin C. A blow of a hammer upon the steel head E will cause the tool to grasp the tire so firmly that it will not slip, and repeated blows of the hammer upon the said head E will upset the tire to any desired amount. A slight blow of the hammer upon the lower side of the clamp D will loosen it so that it can be unhooked and removed.

The tool is used in the same way for upsetting other pieces of iron.

As the plug or pin E is only intended to receive the blows of the hammer and prevent the clamp D from being marred or injured by the said blows, it may be omitted and the head of the clamp D so formed or made of such a material that it will not be marred or injured by blows with a hammer.

Having thus fully described my invention, I claim as new and desire to secure by Letters Patent—

1. The upsetter, formed of the handle A, provided with a cylindrical head, B, the eccentric pin C, and the U-shaped clamp D, made with hooks $d'$, substantially as herein shown and described.

2. The combination of the handle A, provided with a cylindrical head, B, the eccentric pin C, the U-shaped clamp D, made with hooks $d'$, and the plug or pin E, with each other, substantially as herein shown and described.

ELISHA DEPUE.

Witnesses:
J. D. OWEN,
N. J. COGSWELL.